US011072864B2

(12) United States Patent
Clarke et al.

(10) Patent No.: US 11,072,864 B2
(45) Date of Patent: *Jul. 27, 2021

(54) SYSTEMS AND METHODS FOR CONTINUOUS ALKALINE LEAD ACID BATTERY RECYCLING (71) Applicant: Aqua Metals Inc., Alameda, CA (US)

(72) Inventors: Robert Lewis Clarke, Orinda, CA (US); Samaresh Mohanta, San Diego, CA (US)

(73) Assignee: AQUA METALS INC., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,245

(22) Filed: Jun. 7, 2019

(65) Prior Publication Data

US 2019/0301031 A1    Oct. 3, 2019

Related U.S. Application Data (62) Division of application No. 14/957,026, filed on Dec. 2, 2015, now Pat. No. 10,316,420.

(51) Int. Cl.
| C25C 1/18 | (2006.01) |
| C22B 3/12 | (2006.01) |
| C22B 3/16 | (2006.01) |
| C25C 7/00 | (2006.01) |
| C25C 7/02 | (2006.01) |
| C25C 7/08 | (2006.01) |
| C22B 3/04 | (2006.01) |
| C22B 3/08 | (2006.01) |
| C22B 3/00 | (2006.01) |

(52) U.S. Cl.
CPC ............... *C25C 1/18* (2013.01); *C22B 3/045* (2013.01); *C22B 3/08* (2013.01); *C22B 3/12* (2013.01); *C22B 3/16* (2013.01); *C22B 13/045* (2013.01); *C25C 7/007* (2013.01); *C25C 7/02* (2013.01); *C25C 7/08* (2013.01); *Y02P 10/20* (2015.11); *Y02W 30/84* (2015.05)

(58) Field of Classification Search
None
See application file for complete search history.

(56) References Cited

U.S. PATENT DOCUMENTS

| 292,753 A | 1/1884 | Kessler |
| 1,148,062 A | 7/1915 | Tucker |
| 1,334,419 A | 3/1920 | Tainton |
| 1,752,356 A | 4/1930 | Smith |
| 1,759,494 A | 5/1930 | Tainton |
| 1,911,604 A | 5/1933 | Calbeck |
| 1,942,208 A | 1/1934 | Gamichon |
| 2,166,367 A | 7/1939 | Norris |
| 2,655,472 A | 10/1953 | Hilliard et al. |
| 3,153,590 A | 10/1964 | Storchheim |
| 3,262,868 A | 7/1966 | Juda |
| 3,395,010 A | 7/1968 | Shoeld |
| 3,616,277 A | 10/1971 | Adamson et al. |
| 3,647,545 A | 3/1972 | Mao |
| 3,772,003 A | 11/1973 | Gordy |
| 3,860,509 A | 1/1975 | Emmett |
| 4,035,242 A | 7/1977 | Brandt |
| 4,097,354 A | 6/1978 | Ginatta |
| 4,107,007 A | 8/1978 | Gaumann et al. |
| 4,118,219 A | 10/1978 | Elmore et al. |
| 4,128,460 A | 12/1978 | Nishimura et al. |
| 4,159,231 A | 6/1979 | Smith et al. |
| 4,222,769 A | 9/1980 | Okuda et al. |
| 4,229,271 A | 10/1980 | Prengaman et al. |
| 4,269,810 A | 5/1981 | Kolakowski |
| 4,460,442 A | 7/1984 | Ducati |
| 4,650,553 A | 3/1987 | Felgendreger et al. |
| 4,652,349 A | 3/1987 | Behringer et al. |
| 4,769,116 A | 9/1988 | Olper et al. |
| 4,773,978 A | 9/1988 | Thomassen et al. |
| 4,849,059 A | 7/1989 | Deresh et al. |
| 4,927,510 A | 5/1990 | Olper et al. |
| 4,944,851 A | 7/1990 | Cordani et al. |
| 5,106,466 A | 4/1992 | Olper et al. |
| 5,124,008 A | 6/1992 | Rendall et al. |
| 5,211,818 A | 5/1993 | Moure, Jr. et al. |
| 5,230,779 A | 7/1993 | Martin |

(Continued)

FOREIGN PATENT DOCUMENTS

| CA | 1308057 C | 9/1992 |
| CA | 1310837 C | 12/1992 |

(Continued)

OTHER PUBLICATIONS

Notification of the First Office Action for China Application No. 201680080516.9, dated Jul. 2, 2019, 09 Pages.
Evertsson et al., "The thickness of native oxides on aluminum alloys and single crystals," Applied Surface Science, 2015; 349:826-832.
Atanasova et al., "Desulpherization of lead cake by sodium carbonate and sodium hydroxide," Journal of the University of Chemical Technology and Metallurgy, 2008; 43(2):267-272.
Bandanoiu et al., "Study Concerning PbO Solubility in NaOH Solution for th eTreatment of Sulfate-oxide Pastes lbtained fro Dismantling used Lead-acid Batteries," Rev. Chem., Jan. 2013; 64(9):1004-1010.
Birk, "Lead, Pb2+", http://www.public.asu.edu~jpbirk/qual/qualanal/lead.html, Feb. 2002, accessed on May 9, 2018, evidence of existence as prior art supported by https://web.archive.org/web/20020209174305/http://www.public.asu.edu/~jpbirk/qual/qualanal/lead.html.

(Continued)

Primary Examiner — Harry D Wilkins, III
(74) Attorney, Agent, or Firm — Umberg Zipser LLP (57) ABSTRACT Lead is recycled from lead paste of lead acid batteries in a process that employs alkaline desulfurization followed by formation of plumbite that is then electrolytically converted to pure lead. Remaining insoluble lead dioxide is removed from the lead plumbite solution and reduced to produce lead oxide that can be fed back to the recovery system. Sulfate is recovered as sodium sulfate, while the so produced lead oxide can be added to lead paste for recovery.

20 Claims, 3 Drawing Sheets

(56) References Cited

U.S. PATENT DOCUMENTS

| | | | |
|---|---|---|---|
| 5,262,020 | A | 11/1993 | Masante et al. |
| 5,429,661 | A | 7/1995 | Khodov et al. |
| 5,514,263 | A | 5/1996 | Spijkerman et al. |
| 5,520,794 | A | 5/1996 | Gemon |
| 5,750,019 | A | 5/1998 | Olper |
| 5,827,347 | A | 10/1998 | Margulis |
| 5,928,488 | A | 7/1999 | Newman |
| 6,183,619 | B1 | 2/2001 | Gillman et al. |
| 6,428,676 | B1 | 8/2002 | Onuoha |
| 6,679,471 | B2 | 1/2004 | Domeier et al. |
| 6,860,983 | B2 | 3/2005 | Bellino et al. |
| 7,368,043 | B2 | 5/2008 | Mohanta et al. |
| 7,507,496 | B1 | 3/2009 | Kinsbursky et al. |
| 8,323,595 | B1 | 12/2012 | Smith et al. |
| 8,409,421 | B2 | 4/2013 | Olper et al. |
| 8,580,414 | B2 | 11/2013 | Clarke |
| 9,837,689 | B2 | 12/2017 | Clarke et al. |
| 10,316,420 | B2 * | 6/2019 | Clarke .................... C25C 7/007 |
| 2004/0004003 | A1 | 1/2004 | Hesse |
| 2004/0140222 | A1 | 7/2004 | Smedley et al. |
| 2004/0222085 | A1 | 11/2004 | Mohanta et al. |
| 2006/0091017 | A1 | 5/2006 | Lam |
| 2008/0128293 | A1 | 6/2008 | Mohanta et al. |
| 2010/0043600 | A1 | 2/2010 | Martini |
| 2011/0033760 | A1 | 2/2011 | Clarke |
| 2011/0083970 | A1 | 4/2011 | Olper et al. |
| 2011/0265969 | A1 | 11/2011 | Liu et al. |
| 2014/0131219 | A1 | 5/2014 | Fassbender et al. |
| 2014/0131220 | A1 | 5/2014 | Fassbender et al. |
| 2015/0368750 | A1 | 12/2015 | Spence |
| 2016/0294024 | A1 | 10/2016 | Clarke et al. |
| 2016/0308261 | A1 | 10/2016 | Tyagi et al. |
| 2017/0159191 | A1 | 6/2017 | Clarke et al. |
| 2017/0352927 | A1 | 12/2017 | Dougherty et al. |
| 2018/0069276 | A1 | 3/2018 | Clarke et al. |
| 2018/0127852 | A1 | 5/2018 | Clarke et al. |
| 2018/0127888 | A1 | 5/2018 | Clarke et al. |
| 2018/0355494 | A1 | 12/2018 | Clarke et al. |

FOREIGN PATENT DOCUMENTS

| | | |
|---|---|---|
| CN | 1470675 A | 1/2004 |
| CN | 1846005 A | 10/2006 |
| CN | 101012514 A | 8/2007 |
| CN | 101250720 A | 8/2008 |
| CN | 101335370 A | 12/2008 |
| CN | 101899576 A | 12/2010 |
| CN | 101918600 B | 12/2010 |
| CN | 101956214 A | 1/2011 |
| CN | 102146572 A | 8/2011 |
| CN | 102560535 A | 7/2012 |
| CN | 102618884 A | 8/2012 |
| CN | 103509949 A | 1/2014 |
| CN | 104039991 A | 9/2014 |
| CN | 104532302 A | 4/2015 |
| CN | 105981212 A | 9/2016 |
| CN | 107112606 A | 8/2017 |
| EP | 0038366 A1 | 10/1981 |
| EP | 0724306 A1 | 7/1996 |
| FR | 2207997 A1 | 6/1974 |
| IN | 59250 | 12/1957 |
| JP | S5493626 A | 7/1979 |
| JP | S5848645 A | 3/1983 |
| JP | S624892 A | 1/1987 |
| JP | H913189 A | 1/1997 |
| JP | 2001017942 A | 1/2001 |
| SU | 1151595 A1 | 4/1985 |
| SU | 1675393 A1 | 9/1991 |
| WO | 9214866 A1 | 9/1992 |
| WO | 9533756 A1 | 12/1995 |
| WO | 9966105 A1 | 12/1999 |
| WO | 2007044852 A2 | 4/2007 |
| WO | 2008044852 A1 | 4/2008 |
| WO | 2013152260 A1 | 10/2013 |
| WO | 2014076544 A1 | 5/2014 |
| WO | 2014076547 A1 | 5/2014 |
| WO | 2015057189 A1 | 4/2015 |
| WO | 2015077227 A1 | 5/2015 |
| WO | 2015084950 A1 | 6/2015 |
| WO | 2016081030 A1 | 5/2016 |
| WO | 2016130675 A1 | 8/2016 |
| WO | 2016183428 A1 | 11/2016 |
| WO | 2016183429 A1 | 11/2016 |
| WO | 2016183431 A1 | 11/2016 |
| WO | 2017096209 A1 | 6/2017 |

OTHER PUBLICATIONS

Buzatu et al., "Processing oxidic waste of lead-acid batteries in order to recover lead," Asia-Pac. J. Chem. Eng., 2015; 10:125-132.

Buzatu et al., "Studies on mathematical modeling of the leaching process in order to efficiently recover lead from the sulfate/oxide lead paste," Waste Management, Feb. 2017; 60:723-733.

Carlos et al., "Voltammetric study of lead electrodeposition in the presence of sorbitol and morphological characterization," May 2003; 117:179-186.

Carlos, et al., "Study of the influence of glycerol on the cathodic process of lead electrodeposition and on its morphology," J. Power Sources, Jan. 2001; 92:56-64.

Carlos, et al., "Voltammetric and morphological study of lead electrodeposition on copper substrate for application of a lead-acid batteries," J. Power Sources, May 2004; 132(1-2):261-265.

Genders, David, "Electrochemical Salt Splitting," Electrosynthesis, Watts New Quarterly Newsletter, Sep. 1995:1(1); 8 pgs.

Gircis et al., "Electrochemical phenomena in aqueous electrowinning of lead," J. Applied Electrochemistry, Nov. 1987, 17(6):1234-1245.

International Preliminary Report on Patentability for Application No. PCT/US16/032338, dated May 18, 2017; 7 pgs.

International Preliminary Report on Patentability for Application No. PCT/US2014/066142, dated Mar. 24, 2015, 43 pages.

International Preliminary Report on Patentability for Application No. PCT/US2015/030626, dated Mar. 8, 2017; 12 pgs.

International Preliminary Report on Patentability for Application No. PCT/US2016/032332, dated Sep. 4, 2017; 25 pgs.

International Preliminary Report on Patentability for Application No. PCT/U52016/032334, dated Aug. 27, 2018; 14 pgs.

International Preliminary Report on Patentability for Application No. PCT/U52016/064697, dated Feb. 19, 2018, 18 pgs.

International Search Report and Written Opinion for Application No. PCT/US16/032338, dated Oct. 21, 2016; 17 pgs.

International Search Report and Written Opinion for Application No. PCT/US2014/066142, dated Mar. 24, 2015, 16 pages.

International Search Report and Written Opinion for Application No. PCT/US2015/030626, dated Sep. 10, 2015, 16 pages.

International Search Report and Written Opinion for Application No. PCT/US2016/032332, dated Sep. 12, 2016; 18 pgs.

International Search Report and Written Opinion for Application No. PCT/US2016/032334, dated Sep. 12, 2016; 17 pgs.

International Search Report and Written Opinion for Application No. PCT/US2016/064697, dated Mar. 10, 2017; 14 pgs.

Jordan, Manfred, "Chapter 8—Electrodeposition of Lead and Lead Alloys," Modern Electroplating, Fifth Edition; 2010 John Wily & Sons, Inc.; pp. 249-263.

Li et al., "Electrodeposited lead dioxide coatings," Chem Soc Rev, 2011; 40:3879-3894.

Lyakov et al., "Desulphurization of damped battery paste by sodium carbonate and sodium hydroxide," J. Power Sources, Sep. 2007; 171(2):960-965.

Madkour, Loutfy H., "Electrolytic separation of lead and its dioxide from carbonate ore residiuum," Indian J. Chem Tech, Nov. 1995; 2(6):343-344.

Malak et al., "Comparative analysis of two processes for desulphurization of battery paste," JAMME, Dec. 2012; 55(2):855-859.

Nguyen et al., "More Environmental Friendly Method of Lead Recycling From Waste Battery Paste—An Electrochemical Investigation," Annual Report of FY 2002, The Core University Program

(56) References Cited

OTHER PUBLICATIONS between Japan Society for the Promotion of Science (JSPS) and National Centre for Natural Science and Technology (NCST) pp. 38-45.

Pletcher et al., "A novel flow battery—A lead-acid battery based on an electrolyte with soluble lead (II): V. studies of the lead negative electrode," J Power Sources, 2008; 180:621-629.

Second Written Opinion for Application No. PCT/US16/032334, dated May 22, 2017; 4 pgs.

Sun, et al., "Structural and Morphological Evolution of Lead Dendrites during Electrochemical Migration," Scientific Reports, Nov. 15, 2013; 3(3227); 6 pgs.

Tyagi, Vipin, "A zero lead pollution and economical recycling process for lead-acid batteries utilizing electrowinning in basic medium," 4th International Lead Conference, http://4islc.conferenceworks.eom.au/presentations/a-zero-lead-pollution-and-economical-recycling-process-for-lead-acid-batteries-utilizing-electrowinning-in-basic-medium/, Downloaded Oct. 13, 2015, 2 pages.

Vaysgant et al., "A low-temperature technique for recycling lead/acid battery scrap without wastes and with improved environmental control," Journal of Power Sources, Feb. 1995; 53(2):303-306.

Walsh et al., "Versatile electrochemical coatings and surface layers from aqueous methanesulfonic acid," Surface & Coatings Tech, 2014; 259:676-697.

Wong et al, "Lead electrodeposition from very alkaline media," Electrochemica Acta, Nov. 2005; 51(4):619-626.

Wu et al., "Fundamental study of lead recovery from cerussite concentrate with methanesulfonic acid (MSA)," Hydrometallurgy, 2014; 142:23-35.

Ferracin et al., "Lead recovery from a typical Brazilian sludge of exhausted lead-acid batteries using an electrohydrometallurgical process," Hydrometallurgy, Sep. 2002; 65(2-3):137-144.

Sonmez et al., "Leaching of waste battery paste components. Part 1: Lead citrate synthesis from PbO and $PbO_2$," Hydrometallurgy, Jan. 2009; 95(1-2):53-60.

Liu et al., "Preparation of porous Pb electrode with electrodeposition and its electrocatalytic property of $CO_2$ reduction," Modern Chemical Industry, Sep. 2012; 32(9);43-47.

* cited by examiner

SYSTEMS AND METHODS FOR CONTINUOUS ALKALINE LEAD ACID BATTERY RECYCLING

This application is a divisional application of previously allowed US application with the Ser. No. 14/957,026, which was filed Dec. 2, 2015.

FIELD OF THE INVENTION

The field of the invention is lead acid battery recycling, especially as it relates to aqueous alkaline recycling processes and continuous pure lead recovery using such processes.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

While almost all of the lead from lead acid batteries is recycled, most known processes are environmentally and economically problematic. For example, where lead is recycled using smelting operations, air and water pollution along with production of substantial quantities of toxic waste have lead to the closure of many recycling plants. Moreover, to meet the stringent demands on emissions and energy efficiency, lead acid battery recycling has forced operations to ever increasing throughput, leading to logistics challenges.

To help overcome some of the difficulties with smelting operations, various systems and methods for lead recovery without smelting have been developed. For example, U.S. Pat. No. 4,460,442 teaches a lead recovery process in which lead and lead dioxide are ground and reacted with a strong alkaline solution to produce solid minium ($Pb_3O_4$) that is then subjected to further reaction with hot fluorosilic or fluoroboric acid to dissolve the lead, which is then electroplated from these acids onto a graphite anode. Similarly, U.S. Pat. No. 4,769,116 teaches carbonation reactions of lead paste and subsequent reaction with fluorosilic or fluoroboric acid to form an electrolyte from which lead is plated. All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. While such process advantageously avoids smelting, various difficulties nevertheless remain. Most notably, digestion with fluorosilic or fluoroboric acid is environmentally undesirable and the residual materials contain substantial quantities of lead sulfate.

Lead paste can also be desulfurized using caustic soda (NaOH) or soda ash ($Na_2CO_3$) to produce from lead sulfate the corresponding lead hydroxides or lead carbonates. Alternatively, amine solvents can be used to desulfurized lead paste and produce purified lead sulfate and recycled amine solvent as is described elsewhere (Journal of Achievements in Materials and Manufacturing Engineering 2012, Vol. 55(2), pp. 855-859). Unfortunately, such process does allow for production of pure elemental lead.

Desulfurization can be followed by treatment of lead oxides with an acid and a reducing agent to form a lead salt that is then reacted with a second base under a $CO_2$-free atmosphere at an elevated temperature to form PbO as described in WO 2015/057189. While such process allows for production of PbO, multiple solvent treatment steps and reagents are needed, and pure elemental lead is not readily obtained from such process. Similarly, US 2010/043600 discloses a process for the recovery of high purity lead compounds from paste in which lead oxide is first dissolved in an acid, in which insoluble lead dioxide is reduced, and in which the so obtained lead oxide is converted to lead sulfate that can then be converted to the corresponding carbonate, oxide, or hydroxide. Unfortunately, such process is relatively complex and is thus typically economically unattractive.

In yet another example, WO 2015/084950 describes a process in which lead paste from a battery is first reacted with nitric acid to convert lead dioxides to lead nitrate, and in which lead sulfate is recovered from solution using sulfuric acid to so regenerate the nitric acid. Lead sulfate from the battery paste is subjected to alkali to precipitate lead oxides that are then, after removal of sulfate, converted to lead carboxylate as a raw material for lead monoxide. Unfortunately, the processes described in the '950 application are complex and may not always result in complete recycling and production of pure lead. Significant improvements have been disclosed in WO 2015/077227 where lead paste from lead acid batteries is dissolved in a solvent system that allows for digestion of both lead oxide and lead sulfate, and from which elemental lead can be electrolytically deposited in a chemically pure form. While such system advantageously allows for high lead recovery in a conceptually simple and effective manner, sulfate accumulation in the electrolyte will nevertheless require solvent treatment.

Thus, even though there are numerous systems and methods for lead recycling known in the art, there is still a need for improved systems and methods that produce high purity lead in a simple and economically effective manner.

SUMMARY OF THE INVENTION

The inventive subject matter is directed to various systems and methods of improved lead acid battery recycling in which lead form the active materials in the lead paste is subjected to an alkaline process that allows for simple removal of sulfate while also allowing for electrolytic recovery of lead in a pure form.

In one aspect of the inventive subject matter, method of recovering lead from a battery paste that includes lead oxides and lead sulfate comprises a steps of contacting the battery paste with an aqueous base (e.g., NaOH or $Na_2CO_3$) to form a lead hydroxide-containing precipitate and a sodium sulfate solution. The lead hydroxide-containing precipitate is then separated from the sodium sulfate solution, and at least a portion of the lead hydroxide-containing precipitate is dissolved in a concentrated aqueous base to yield a lead-containing electrolyte and insoluble lead dioxide. In yet another step, adherent lead is continuously formed and removed on an electrode that contacts the lead-containing electrolyte.

Most typically, the aqueous base is added in an amount sufficient to produce lead hydroxide from lead oxide without substantial production of plumbite (i.e., equal or less than 5 mol %, and more typically equal or less than 2 mol % of all lead species are converted into plumbite). Contemplated methods will further include a step of separating the insoluble lead dioxide from the lead-containing electrolyte, and another step of reducing the lead dioxide to lead oxide. Most preferably, reduction of the lead dioxide is performed using sodium sulfite to produce sodium sulfate and lead oxide. In such case, the so produced sodium sulfate and the sodium sulfate solution are electrolyzed to produce sodium hydroxide and sulfuric acid, and the lead oxide is combined with the aqueous base. Consequently, all reagents can be fully recycled.

It is further generally preferred that the lead hydroxide-containing precipitate is dissolved in the concentrated aqueous base to convert substantially all lead hydroxide to plumbite, and/or that the step of continuously forming and removing adherent lead is performed using a moving electrode (e.g., a rotating electrode, a belt electrode, or a reciprocating electrode). Suitable electrode materials include various metals and alloys inert in caustic, however, especially preferred electrodes will comprise nickel plated steel. Where the electrode is a moving electrode, it is generally contemplated that the adherent lead formed on the moving electrode has a bulk density of less than 11 g/cm$^3$ and has a purity of at least 99 atom %.

Therefore, and viewed from a different perspective, the inventors also contemplate a method of recovering lead from a battery paste comprising lead oxides and lead sulfate that includes a step of contacting the battery paste with an aqueous base to form a lead-containing precipitate and a sodium sulfate solution. In another step, the lead-containing precipitate is separated from the sodium sulfate solution, and at least a portion of the lead-containing precipitate is dissolved in an electrolyte fluid to yield a lead-containing electrolyte and insoluble lead dioxide. In a further step, the insoluble lead dioxide and sodium sulfate solution are processed to generate components suitable for use in the step of contacting the battery paste with the aqueous base, while in a still further step adherent lead is continuously formed and removed on an electrode that contacts the lead-containing electrolyte.

It is generally contemplated that the aqueous base is added in an amount sufficient to produce lead carbonate or lead hydroxide from lead oxide. Thus, suitable electrolyte fluids especially include sodium hydroxide solutions, sodium carbonate solutions, and methanesulfonic acid solutions. Consequently, the lead-containing precipitate may comprise lead hydroxide or lead carbonate, and may further comprise lead dioxide.

In still further contemplated aspects, insoluble lead dioxide may be separated from the lead-containing electrolyte and be subjected to a chemical reaction to reduce the lead dioxide to lead oxide (e.g., by conversion of the insoluble lead dioxide to lead oxide using sodium sulfite and by conversion of the sodium sulfate solution to a sodium hydroxide solution). Alternatively it is also contemplated that other reducing agents such as hydrogen peroxide, hydrazine sulfate or sodium dithionate can be used to reduce lead dioxide to lead oxide.

Where the electrolyte fluid is methanesulfonic acid solution, especially preferred electrodes comprise aluminum, while the electrode in alkaline electrolytes is preferably nickel coated steel. Depending on the particular solvent, it is contemplated that at least a portion of the lead-containing electrolyte after the step of continuously forming and removing is treated to reduce a sodium ion concentration (e.g., by precipitation with strong HCl as NaCl, via reverse osmosis, electrodialysis, or other suitable method).

Various objects, features, aspects and advantages of the inventive subject matter will become more apparent from the following detailed description of preferred embodiments, along with the accompanying drawing figures in which like numerals represent like components.

DETAILED DESCRIPTION

The inventors have discovered that lead from lead paste can be electrolytically recovered in a conceptually simple and effective manner using an alkaline desulfurization process in which lead oxide and lead sulfate from the paste are reacted with a base to convert the lead species into the corresponding insoluble lead salts that form a precipitate and to produce a sulfate solution that is then separated from the precipitate. The precipitate (e.g., typically lead hydroxide or lead carbonate) and remaining other insoluble lead oxides (e.g., lead dioxide) is then subjected to a substantially higher pH, yielding soluble plumbite (e.g., $Na_2PbO_2$) and undissolved lead dioxide that is removed from the plumbite solution. Undissolved lead dioxide is reduced to lead oxide (e.g., using sodium sulfite or hydrogen peroxide) and recycled for subsequent processing, and pure lead is recovered from the plumbite solution on a moving electrode to produce adherent lead. Alternatively, the precipitate may be dissolved in an electrochemically stable acid (e.g., methanesulfonic acid) and recovered as pure lead, while remaining undissolved lead dioxide is recycled as noted before.

In one especially preferred aspect, lead acid batteries are disintegrated and metallic lead, plastic, and sulfuric acid are collected as is well known in the art. The remaining active material paste comprising lead oxides and lead sulfate (e.g., 12-16 mol % PbO, 18-25 mol % $PbO_2$, 54-60 mol % $PbSO_4$, 1-3 mol % Pb) is collected and rinsed as appropriate or needed (e.g., using water, base, or sulfuric acid). Plastic, metallic lead, and sulfuric acid can be processed in numerous manners. For example, polymeric materials can be recycled to form new battery components or other value products, while metallic lead (e.g., grid lead) can be cleaned and pressed into lead chips or ingots to so yield recycled grid lead that can be directly reused or further refined in a downstream process as needed. Likewise, the recovered sulfuric acid may be utilized in the manufacture of new lead acid batteries, typically after a filtration or other clean-up process.

The active material paste is then subjected to a desulfurization step in which base-soluble sulfate salts (typically sodium sulfate) are formed in a typically dilute aqueous solution and at a pH that is suitable to promote formation of insoluble lead hydroxide from the lead sulfate and lead oxide without substantial production of plumbite (e.g., equal or less than 5 mol %, more typically equal or less than 1 mol %, even more typically equal or less than 0.1 mol %, and most typically equal or less than 0.01 mol % of all lead species are converted into plumbite). Most typically, the desulfurization is performed using sodium hydroxide in water at concentrations of between about 2.0 M to 4.0 M, a temperature of between about 20° C. to 50° C., and for a period of between about 10 min to 60 min, or 1-2 hours, or 2-6 hours, or 6-12 hours, or even longer. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary. However, it should be appreciated that various other process conditions are also deemed suitable and include lower molarities of sodium hydroxide, including 1.0 M to 2.0 M, or 0.1 M to 1.0 M. Similarly, higher molarities of sodium hydroxide, including 4.0 M to 6.0 M, or 6.0 M to 8.0 M are also contemplated, typically with shorter reaction times and/or lower temperatures. Thus, the pH of the desulfurization reaction is typically between 8.0 and 9.0, between 9.0 and 10.0, or between 10.0 and 11.0. Likewise, it should be noted that the temperature of the desulfurization reaction will be between about 10° C. to 30° C., or between about 20° C. to 50° C., or between about 50° C. to 70° C., and in some cases even higher.

In still further contemplated aspects of the inventive subject matter, it should be noted that the base solution need not be limited to sodium hydroxide, but may also include various other hydroxides and/or carbonates (e.g., KOH, $Na_2CO_3$, etc.) in quantities and at a pH suitable to dissolve lead sulfate into the corresponding soluble lead salt. As noted before, it is generally preferred that the base solution will be used in an amount sufficient to produce lead hydroxide or carbonate (or other species) from lead sulfate and lead oxide without substantial production of plumbite. Viewed from another perspective, resulting aqueous solutions will contain significant quantities of lead hydroxide- or carbonate-containing precipitate and dissolved sodium sulfate. As lead dioxide is generally insoluble (or only minimally soluble) in aqueous alkaline solutions, the precipitate will also include appreciable quantities of lead dioxide (and to some degree also elemental lead). Thus, desulfurization of lead paste from lead acid batteries will result in a lead hydroxide- or lead carbonate-containing precipitate that further includes insoluble lead dioxide and elemental lead.

Advantageously, the so generated sulfate-rich solution is separated from the precipitate and further processed. Especially preferred processing steps include electrolytic treatment where the sulfate-rich solution is an aqueous solution of sodium sulfate. Electrolysis of sodium sulfate will yield sodium hydroxide and sulfuric acid, both of which can be recycled. For example, the sodium hydroxide can be used as the base for desulfurization and as the electrolyte in the lead recovery process, while the sulfuric acid can be used as battery acid in newly produced batteries. Alternative uses of isolated sulfate include precipitation with calcium ions to produce gypsum as a value product or precipitation with ammonium ions to yield ammonium sulfate. Additionally, it should be noted that sodium sulfate may also be (continuously) removed from the electrolyte by cooling at least a portion (e.g., slip stream) of the electrolyte to a temperature sufficiently low to crystallize out sodium sulfate, which can then be removed from the electrolyte.

Where desired, the precipitate can be washed using various solutions to reduce residual sulfate. Most typically, such wash solution is an aqueous solution and may include dilute base (e.g., sodium hydroxide solution), water, or other fluid that can preferably be recycled in the process. Residual sulfate in the precipitate is preferably present in concentrations at or below 2 mol %, more typically at or below 1 mol %, even more typically at or below 0.1 mol %, and most typically at or below 0.01 mol %. However, it should be appreciated that where the precipitate is subsequently dissolved in an acid (e.g., methane sulfonic acid), residual sulfate is less critical but residual sodium will preferably be present in concentrations at or below 2 mol %, more typically at or below 1 mol %, even more typically at or below 0.1 mol %, and most typically at or below 0.01 mol %.

Regardless of the manner of treatment of the precipitate, it should be appreciated that the remaining lead species include lead hydroxide, lead dioxide, and metallic lead. While the lead hydroxide or lead carbonate in the precipitate can be readily dissolved in various solvents as is further discussed in more detail below, it should be recognized that lead dioxide and metallic lead are not readily soluble in most solvents. However, lead dioxide does represent a significant portion of the lead paste in recycled batteries (typically at least 5 mol %, more typically at least 10 mol %, and most typically at least 15 mol %), and would be lost to the recovery process if not further treated. Advantageously, lead dioxide can be reduced to lead oxide as is further described in more detail below, and so generated lead oxide can reenter the recovery process (typically by addition to the lead paste or aqueous base).

In a still further aspect of the inventive subject matter, the precipitate is combined with a preferably aqueous electrolyte fluid that dissolves the lead hydroxide and/or lead carbonate to so yield a lead-containing electrolyte and insoluble lead dioxide. While not limiting to the inventive subject matter, especially preferred electrolyte fluids include methane sulfonic acid and sodium hydroxide at a relatively high concentration. Where methane sulfonic acid (MSA) is employed to at least partially dissolve the lead-containing precipitate, it is contemplated that the electrolyte may also include a lead-ion chelating agent, and especially EDTA (ethylenediaminetetraacetic acid). On the other hand, where the electrolyte is an aqueous sodium hydroxide solution, it is generally preferred that such solution will have a concentration and a pH effective to convert substantially all (e.g., at least 95 mol %, more typically at least 98 mol %, most typically at least 99 mol %) lead hydroxide to plumbite that is highly soluble in aqueous basic solutions. As a result, it should be recognized that the electrolyte will now contain dissolved ionic lead species while other heavy metals that are potentially present in the battery paste and electrolyte (e.g., Sb, Ca, Sn, Cu, As) will not dissolve in the electrolyte and thus not adversely interfere and/or plate in the subsequent electrolytic recovery of lead as further described in more detail below.

Undissolved lead dioxide can be readily isolated from the lead-containing electrolyte via filtration, sedimentation, centrifugation, etc., and is preferably further processed in a reduction process in which the lead dioxide is converted to lead oxide. Most preferably, the reducing agent is compatible with the recovery systems and methods described herein, including various organic acids (e.g., oxalate), hydrogen peroxide, hydrazine sulfate, and sodium sulfite. For example, where the reducing agent is sodium sulfite, the reduction reaction will yield lead oxide and sodium sulfate. So generated sodium sulfate can be combined with the sodium sulfate obtained from the desulfurization reaction for recycling in the process, while the lead oxide may be combined with battery paste or the aqueous base to form more lead hydroxide in the process.

Of course, it should be appreciated that lead dioxide present in the battery paste may also be reduced prior to the desulfurization to form a pre-treated battery paste that has a significantly reduced concentration of lead dioxide (e.g., residual lead dioxide equal or less than 5 mol %, or equal or less than 2 mol %, or equal or less than 0.5 mol %, or equal or less than 0.1 mol % of all lead species in the pre-treated paste). Pretreatment is typically done using a reducing agent that is suitable to form lead oxide from lead dioxide, and especially suitable reducing agents include hydrogen peroxide, gaseous sulfur dioxide (fed to an aqueous solution), hydrazine sulfate, and sodium sulfite. For example, hydrogen peroxide will reduce lead dioxide and yield lead oxide and water, and where the reducing agent is sodium sulfite, the reduction reaction will yield lead oxide and sodium sulfate. As noted before, the so pre-treated battery paste can then be subjected to the desulfurization reaction. Alternatively, the lead dioxide may also be reduced in an acid electrolyte using peroxide or other reducing agent at the time when desulfurized lead precipitates are dissolved into the acidic electrolyte.

With respect to the lead-containing electrolyte it is generally preferred that the electrolyte is subjected to electrolytic recovery of lead, preferably using a moving electrode in a continuous fashion to so form adherent lead. As used herein, the term "adherent" when used in conjunction with metallic lead formed by reduction of ionic lead refers to a form of lead that is not a coherent film bound to a surface of the cathode, but that is amorphous and can be wiped or rinsed off the cathode. In other words, an adherent lead product does not form in a macroscopic dimension intermetallic bonds between the cathode and the lead product and will therefore not form a coherent lead film on the cathode. For example, by observation in most experiments, lead formed in a micro- or nanocrystalline low density layer that was loosely attached to the cathode, floated off a static plate cathode, and could be washed off the surface of a rotating cathode if electrolyte circulation was too aggressive. Formation of adherent lead on the electrode is particularly advantageous where the electrode comprises a moving surface. In most cases, the inventors found that less than 10% (e.g., between 5-9%), more typically less than 7% (e.g., between 2-6%), even more typically less than 5% (e.g., between 1-4%), and most typically less than 3% (e.g., between 0.01-2%) of the total lead formed at the cathode was found as plated and strongly bonded lead on the cathode, while the remainder of the lead remained in the adherent low density form. Among other advantages, and while not wishing to be bound by any theory or hypothesis, the inventors contemplate that the relative movement of electrolyte and electrode will result in micro- or nanocrystalline growth of elemental lead on the electrode surface, which in turn appears to promote hydrogen formation and/or entrapment. Notably, the hydrogen associated with the adherent lead will have at least two desirable effects with respect to lead chemistry: First, lead is adherent and easily removed from the surface of the electrode which is ordinarily not achieved with static electrodes and alternate salts of lead. Second, the so produced adherent lead has micro- or nanocrystalline growth structures with relatively large surface area that is protected from oxidation (or passivation) by the reducing hydrogen micro-atmosphere in the adherent lead. Consequently, so produced adherent lead is readily cold-formable by compression to larger macroscopic structures without formation of grain boundaries. Particular devices and methods suitable for production of adherent lead are disclosed in commonly owned WO 2015/077227, which is incorporated by reference herein.

Figure 1:
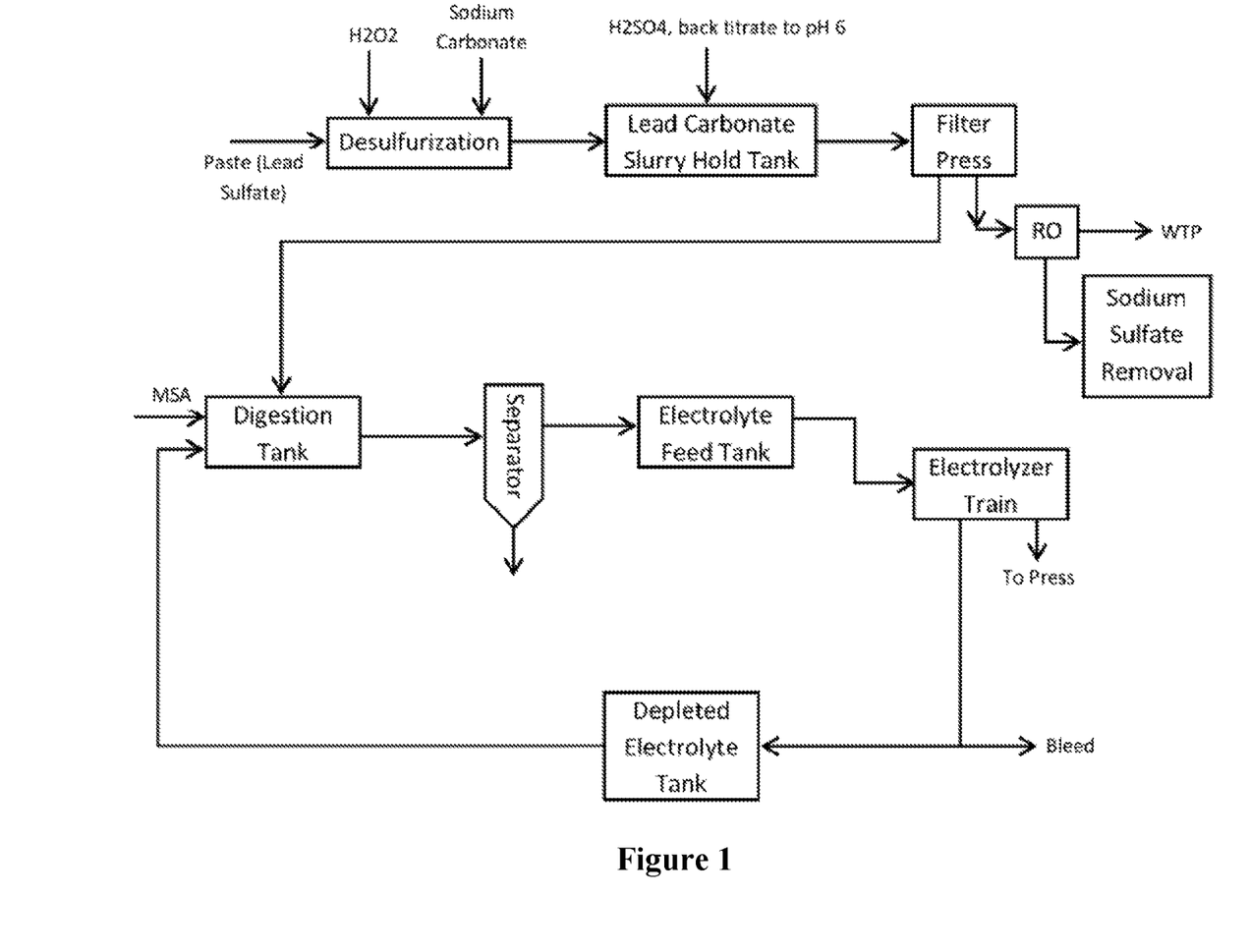
FIG. 1 is a first exemplary process according to the inventive subject matter.

A first exemplary process according to the inventive subject matter is shown in FIG. 1 where the battery recycling process employs an upstream desulfurization process in which lead paste (comprising lead sulfate and lead oxides) is combined with sodium carbonate and hydrogen peroxide. As noted before, the lead sulfate of the battery paste is converted to lead carbonate and highly soluble sodium sulfate is formed which can be readily removed from the lead carbonate precipitate. To reduce sodium-lead carbonate concentration, pH of the desulfurization mixture can be reduced to about pH 6.0 (e.g., using sulfuric acid). At this stage, lead dioxide is reduced to lead oxide via the hydrogen peroxide, and it should be appreciated that the lead dioxide may be derived from the paste alone or in combination with lead dioxide from the later step of dissolving lead carbonate/oxide in the electrolyte. Once the desulfurization reaction has completed or reached an acceptable degree of desulfurization (e.g., at least 90%, or at least 95%, or at least 99% of all lead sulfate converted to lead carbonate), the lead carbonate and lead oxide are processed to remove desulfurization solution. Of course, it should be appreciated that a rinsing step (e.g., with water or electrolyte) may be implemented prior to processing. Most typically, processing is performed by filter pressing, but other manners of processing are also contemplated, including heating, centrifugation, etc. The desulfurization solution can then be subjected to one or more steps of sulfur recovery (e.g., precipitation with suitable cations or via crystallization of sodium sulfate, or via ion exchange or reverse osmosis, etc), while recovered water can be processed or fed to a waste water treatment plant.

So obtained lead carbonate/lead oxide (possibly with minor quantities of lead dioxide) is then dissolved in an acid electrolyte that is stable under electroplating conditions and dissolves lead at high concentrations. Most preferably, such electrolyte is methane sulfonic acid as already discussed above, and alternative electrolytes include halogenated alkane sulfonic acids, etc. Once the dissolution process of the lead carbonate/lead oxide in the acid electrolyte is complete, any remaining undissolved lead species (and especially remaining lead dioxide) is removed in a separator and optionally fed back to the desulfurization step while dissolved lead species are fed to an electrolyte feed tank. Elemental lead is (preferably continuously) removed as adherent lead on the electrode as further discussed below while the depleted electrolyte is recycled back for dissolving new carbonate/lead oxide.

Figure 2:
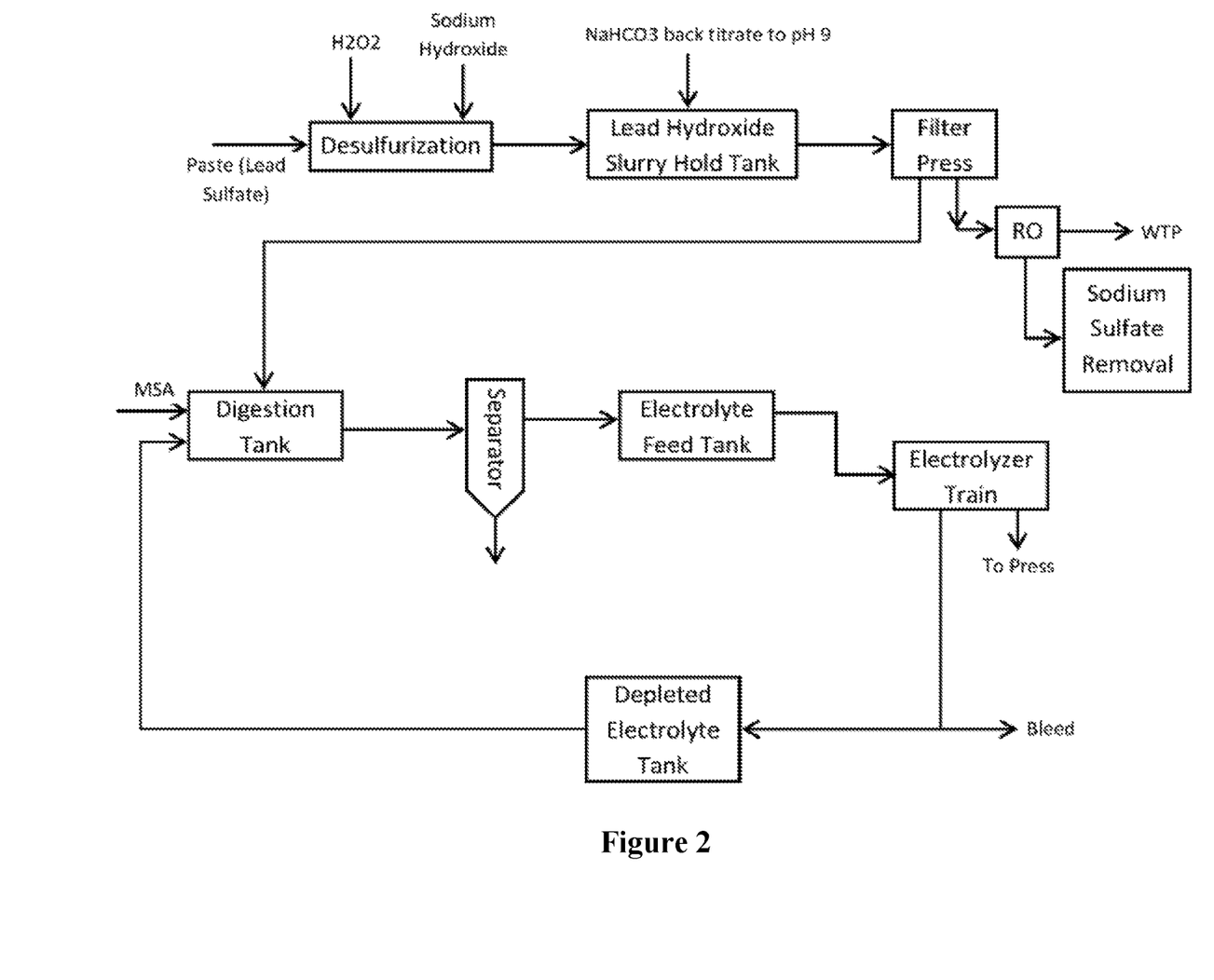
FIG. 2 is a second exemplary process according to the inventive subject matter.

Alternatively, the desulfurization step could also be performed using sodium hydroxide instead of sodium carbonate as is shown in the second exemplary process of FIG. 2. Here, the battery recycling process employs an upstream desulfurization process in which lead paste (comprising lead sulfate and lead oxides) is combined with sodium hydroxide and hydrogen peroxide. As noted earlier, the lead sulfate of the battery paste is converted to lead hydroxide and highly soluble sodium sulfate is formed which can be readily removed from the lead hydroxide precipitate. To reduce dissolved lead concentration in the sodium sulfate solution in such process, the pH of the desulfurization mixture can be increased to about pH 9.0 (e.g., using sodium hydroxide). As noted above, lead dioxide is reduced to lead oxide via the hydrogen peroxide, and it should be appreciated that lead dioxide may be derived from the paste alone or in combination with lead dioxide from the later step of dissolving lead hydroxide/oxide in the electrolyte. Once the desulfurization reaction has completed or reached an acceptable degree of desulfurization (e.g., at least 90%, or at least 95%, or at least 99% of all lead sulfate converted to lead hydroxide), the lead hydroxide and remaining lead oxide are processed to remove the desulfurization solution. Of course, it should be appreciated that a rinsing step (e.g., with water or electrolyte) may be implemented prior to processing. Most typically, processing is performed by filter pressing, but other manners of processing are also contemplated, including heating, centrifugation, etc. The desulfurization solution can then be subjected to one or more steps of sulfur recovery (e.g., precipitation with suitable cations or via crystallization of sodium sulfate, or via ion exchange or reverse osmosis, etc), while recovered water can be processed or fed to a waste water treatment plant.

So obtained lead hydroxide/lead oxide (possibly with minor quantities of lead dioxide) is then dissolved as above in an acid electrolyte that is stable under electroplating conditions and dissolves lead at high concentrations. Most preferably, such electrolyte is methane sulfonic acid as already discussed above, and alternative electrolytes include halogenated alkane sulfonic acids, etc. Once the dissolution process of the lead hydroxide/lead oxide in the acid electrolyte is complete, any remaining undissolved lead species (and especially remaining lead dioxide) is removed in a separator and optionally fed back to the desulfurization step while dissolved lead species are fed to an electrolyte feed tank. Elemental lead is again (preferably continuously) removed as adherent lead on the electrode as discussed below while the depleted electrolyte is recycled back for dissolving new carbonate/lead oxide. Table 1 provides a comparison for various exemplary process parameters for the desulfurization options of FIGS. 1 and 2.

TABLE 1

|  | Process Parameter | $CO_3^{2-}$ | $OH^-$ |
|---|---|---|---|
| Operating | Excess over Stoich. | 10% | 10% |
| Parameter | Solid/Liquid Ratio | 1:(2 to 2.5) | 1:2 |
|  | Temp., deg C. | 55-35 | 55-35 |
|  | Residence time, min. | 15-30 | 15-30 |
| Performance | Desulphurization, % | 92.4-94.4 | 93.6-97.0 |
|  | Sulfate remaining in paste, % | 0.4 | 0.3 |

Figure 3:
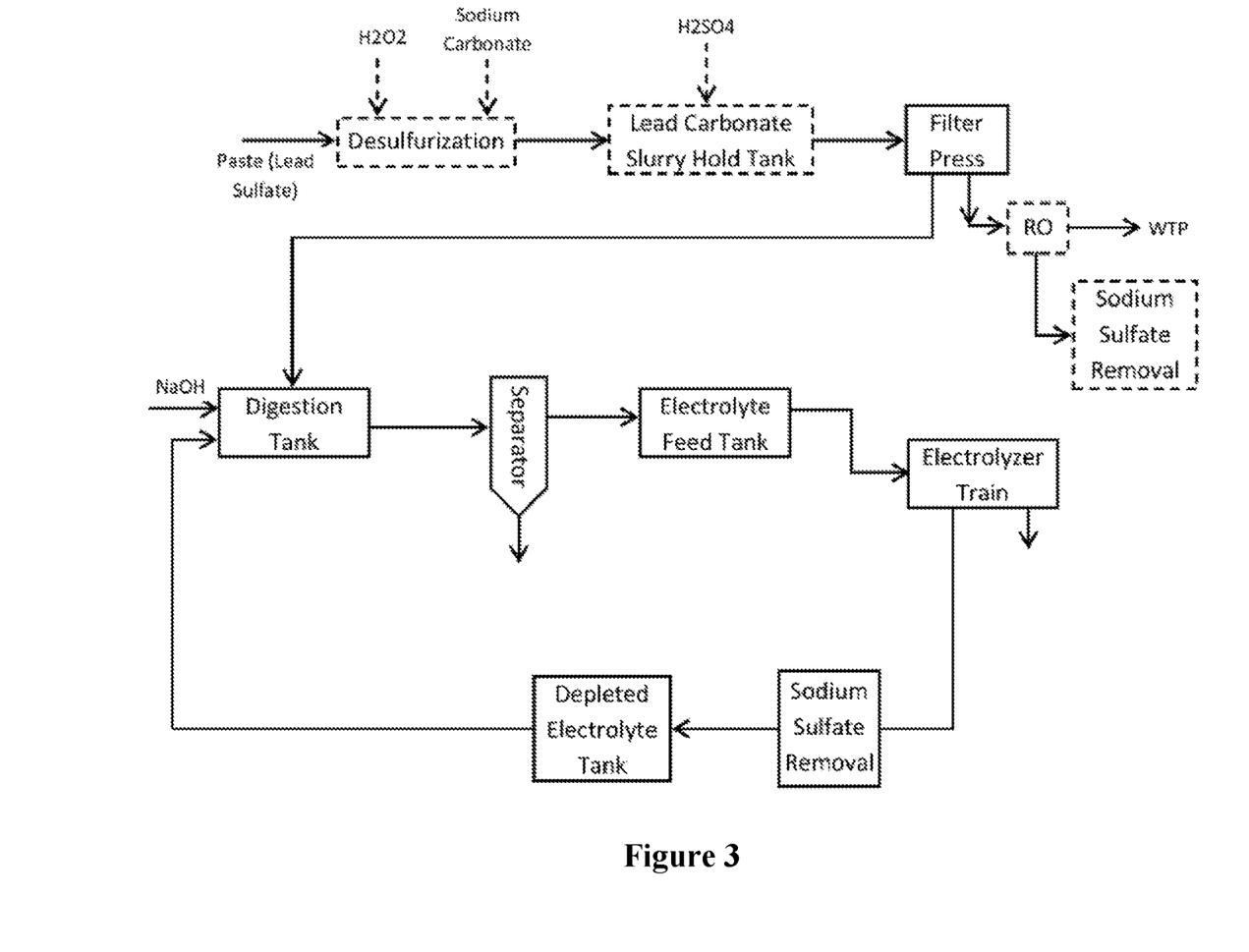
FIG. 3 is a third exemplary process according to the inventive subject matter.

In yet another contemplated process as exemplarily depicted in FIG. 3, the desulfurization process is eliminated and the lead paste comprising lead sulfate and lead oxides is, after a step to remove sulfuric acid or wash medium (e.g., via a filter press), combined with sodium hydroxide under conditions effective to convert the lead sulfate and the lead oxide to the corresponding lead hydroxide precipitate while forming highly soluble sodium sulfate that can be readily removed from the lead hydroxide precipitate. Residual undissolved lead dioxide is then reduced (e.g., with sodium sulfide or other agent as discussed above) to lead oxide that will readily convert to lead hydroxide. In the example of FIG. 3, the lead hydroxide is then converted to lead plumbite using more sodium hydroxide to achieve a pH suitable for formation of lead plumbite (e.g., pH≥11.5). Any undissolved material is then removed from the alkaline electrolyte in one or more separators and the so obtained alkaline electrolyte is fed to an electrolyte feed tank. It should be noted that the sulfate can be recovered from the electrolyte (preferably after electrolysis) using various methods, and suitable methods include cooling and precipitation of sodium sulfate from at least a portion of the electrolyte, specific precipitation, electrodialysis, or ion exchange. Elemental lead is again (preferably continuously) removed as adherent lead on the electrode as discussed below while the depleted electrolyte is recycled back for dissolving additional lead paste.

While a lack of plating is typically undesirable in all or most electrowinning methods, the inventors now discovered that such lack of plating will enable a continuous lead recycling process in which lead can be continuously removed from the cathode on one segment while additional lead is formed on another segment of the cathode. Removal of the adherent/weakly associated lead is typically done using a mechanical implement (e.g., a wiping surface, blade, or other tool in close proximity to the cathode, etc.), however, removal can also be performed via non-mechanical tools (e.g., via jetting electroprocessing solvent against the cathode, or sparging gas against the cathode, etc.). Moreover, it should be noted that the removal may not use an implement at all, but merely by done by passive release of the low density lead material from the cathode and flotation to the surface of the electrochemical cell (where an overflow weir or harvesting will receive the lead materials).

Viewed from a different perspective, it should also be recognized that a moving electrode for deposition of adherent/micro- or nanocrystalline lead advantageously allows for continuous recovery of lead as opposed to static electrodes. Among other things, large electrolytic recovery operations for lead often encounter interruptions in current supply. Since most static electrolytic recovery units typically operate with an acidic electrolyte (e.g., fluoroboric acid), plated lead will re-dissolve into the electrolyte upon collapse of the electric potential. Continuous recovery will not have such defect as lead loss is limited to only a relatively small section on the moving electrode (i.e., the section that contacts the electrolyte). Most preferably, contemplated electrodes are shapes as disk electrodes, cylindrical electrodes, belt electrodes, or reciprocating electrodes, and lead is preferably continuously removed from the surface of the electrode using a wiping implement proximal to the electrode surface. Once sufficient adherent lead has been deposited on the surface of the electrode, the lead catches on the wiping implement (e.g., polymer chute or soft wiping blade) and movement of the electrode past the wiping implement leads to the adherent lead to disengage from the electrode and to fall off. Preferred electrode materials may vary considerably, however, particularly preferred electrode materials include nickel coated steel electrodes, stainless steel, graphite, copper, titanium, manganese dioxide, and even conductive ceramics.

Most notably, and with respect to the adherent lead it should be noted that the metallic lead was recovered from processes of the inventive concept in the form of a micro- or nanoporous mixed matrix in which the lead formed micro- or nanometer sized structures (typically needles/wires) that trapped some of the electroprocessing/electrodeposition solvent and a substantial quantity of molecular hydrogen (i.e., $H_2$). Most notably, such a matrix had a black appearance and a remarkably low bulk density. Indeed, in most of the experimental test runs the matrix was observed to float on the solvent and had a density of less than 1 $g/cm^3$. Upon pressing the matrix or application of other force (and even under the influence of its own weight) the gross density increased (e.g., 1-3 $g/cm^3$, or 3-5 $g/cm^3$, towards that of pure lead ingot) and a metallic silvery sheen appeared. Additionally, the recovered lead had a relatively high purity, and in most cases the lead purity was at least 95 mol %, or at least 97 mol %, or at least 99 mol % of all metallic species.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of continuously recovering lead from a battery paste comprising lead oxides and lead sulfate, comprising the steps of:
    contacting the battery paste with a reducing agent to reduce lead dioxide in the battery paste to lead oxide;
    desulfating the battery paste with an aqueous base to form a lead hydroxide-containing precipitate and a soluble sulfate;
    separating the lead hydroxide-containing precipitate from the soluble sulfate;
    dissolving at least a portion of the lead hydroxide-containing precipitate in a concentrated aqueous base having a pH sufficient to form soluble plumbite to thereby yield a lead-containing electrolyte; and
    continuously forming and removing micro- or nanocrystalline lead at the pH on a moving electrode that contacts the lead-containing electrolyte.

2. The method of claim 1 wherein the aqueous base is added in an amount sufficient to produce lead hydroxide from lead oxide without substantial production of plumbite.

3. The method of claim 1 wherein the reducing agent is hydrogen peroxide or a sulfur-containing reducing agent.

4. The method of claim 3 wherein the step of reducing the lead dioxide to lead oxide is performed using sodium sulfite to produce sodium sulfate and lead oxide.

5. The method of claim 4 wherein the produced sodium sulfate and the sodium sulfate solution are electrolyzed to produce sodium hydroxide and sulfuric acid, and wherein the lead oxide is combined with the aqueous base.

6. The method of claim 1 wherein the lead hydroxide-containing precipitate is dissolved in the concentrated aqueous base to convert substantially all lead hydroxide to the soluble plumbite.

7. The method of claim 1 wherein the step of continuously forming and removing adherent lead is performed using a moving disk electrode.

8. The method of claim 7 wherein the moving electrode is a rotating or reciprocating electrode.

9. The method of claim 7 wherein the electrode comprises nickel plated steel.

10. The method of claim 1 wherein the micro- or nanocrystalline lead has a bulk density of less than 11 $g/cm^3$ and wherein the lead in the adherent lead has a purity of at least 99%.

11. A method of continuously recovering lead from a battery paste comprising lead oxides and lead sulfate, comprising the steps of:
    contacting the battery paste with a reducing agent to reduce lead dioxide in the battery paste to lead oxide;
    contacting the battery paste with an aqueous base to form a lead-containing precipitate and a soluble sulfate;
    separating the lead-containing precipitate from the sodium sulfate solution;
    dissolving at least a portion of the lead-containing precipitate in an electrolyte fluid to yield a lead-containing electrolyte, wherein the electrolyte fluid has a pH sufficient to form lead plumbite;
    processing the insoluble lead dioxide and soluble sulfate to generate components suitable for use in the step of contacting the battery paste with the aqueous base by converting the soluble sulfate to a sodium hydroxide solution that forms at least part of the aqueous base; and
    continuously forming and removing micro- or nanocrystalline lead at the pH on a moving electrode that contacts the lead-containing electrolyte.

12. The method of claim 11 wherein the aqueous base is added in an amount sufficient to produce lead carbonate or lead hydroxide from lead oxide.

13. The method of claim 11 wherein the electrolyte fluid is selected from the group consisting of a sodium hydroxide solution, a sodium carbonate solution, and a methanesulfonic acid solution.

14. The method of claim 11 wherein the lead-containing precipitate comprises lead hydroxide or lead carbonate.

15. The method of claim 11 further comprising a step of separating the insoluble lead dioxide from the lead-containing electrolyte, and reducing the lead dioxide to lead oxide.

16. The method of claim 11 wherein the reducing agent is hydrogen peroxide or a sulfur-containing reducing agent.

17. The method of claim 16 wherein the lead oxide is contacted with the aqueous base, and wherein a portion of the aqueous base is the sodium hydroxide solution.

18. The method of claim 11 wherein the electrolyte fluid is the methanesulfonic acid solution, and wherein the electrode comprises aluminum.

19. The method of claim 11 wherein at least a portion of the lead-containing electrolyte after the step of continuously forming and removing is treated to reduce a sodium ion concentration.

20. The method of claim 11 wherein the micro- or nanocrystalline lead has a bulk density of less than 11 $g/cm^3$ and wherein the lead in the adherent lead has a purity of at least 99%.

* * * * *